US012441530B2

(12) United States Patent
Ichikawa et al.

(10) Patent No.: US 12,441,530 B2
(45) Date of Patent: Oct. 14, 2025

(54) DISCHARGE MEMBER, ACCOMMODATING CONTAINER, METHOD FOR MANUFACTURING DISCHARGE MEMBER, MOLD FOR INJECTION MOLDING, AND DISCHARGE MEMBER WITH CLOSING MEMBER

(71) Applicant: HOSOKAWA YOKO CO., LTD., Tokyo (JP)

(72) Inventors: Toru Ichikawa, Tokyo (JP); Takayuki Kotani, Tokyo (JP); Tomonari Shinohara, Tokyo (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 578 days.

(21) Appl. No.: 17/782,312

(22) PCT Filed: Dec. 1, 2020

(86) PCT No.: PCT/JP2020/044583
§ 371 (c)(1),
(2) Date: Jun. 3, 2022

(87) PCT Pub. No.: WO2021/112053
PCT Pub. Date: Jun. 10, 2021

(65) Prior Publication Data
US 2023/0002136 A1 Jan. 5, 2023

(30) Foreign Application Priority Data
Dec. 6, 2019 (JP) ................................ 2019-221740

(51) Int. Cl.
*B65D 75/58* (2006.01)
*B29C 45/14* (2006.01)
(Continued)

(52) U.S. Cl.
CPC .... *B65D 75/5883* (2013.01); *B29C 45/14065* (2013.01); *B29C 45/26* (2013.01);
(Continued)

(58) Field of Classification Search
CPC .......... B65D 75/5883; B65D 2575/586; B65D 75/5861; B65D 41/04; B29C 45/14065;
(Continued)

(56) References Cited

U.S. PATENT DOCUMENTS 8,403,186 B2 * 3/2013 Kurosawa ......... B29C 45/14836
138/148
2005/0040181 A1 * 2/2005 Kurosawa .......... B65D 75/5883
222/92

(Continued)

FOREIGN PATENT DOCUMENTS

CN 1541905 A 11/2004
CN 1868821 A 11/2006
(Continued)

OTHER PUBLICATIONS

Extended European Search Report dated May 21, 2024 in Application No. 20897494.9.
(Continued)

*Primary Examiner* — Frederick C Nicolas
(74) *Attorney, Agent, or Firm* — Sughrue Mion, PLLC

(57) ABSTRACT

A discharge member used for discharging contents accommodated in a container includes: an attachment part to be attached to the container; and a tubular part that is formed into a tubular shape, through which the contents from the container pass, the tubular part being provided with a tubular member in which a functional resin layer is disposed as an intermediate layer inside in a radial direction. The functional resin layer provided to the tubular member is disposed closer to the outer circumferential surface among the outer circum-
(Continued)

ferential surface and the inner circumferential surface of the tubular member.

6 Claims, 9 Drawing Sheets

(51) Int. Cl.
  *B29C 45/26* (2006.01)
  *B65D 41/04* (2006.01)
  *B29C 45/36* (2006.01)
  *B29L 31/56* (2006.01)

(52) U.S. Cl.
  CPC ............ *B29C 45/261* (2013.01); *B65D 41/04* (2013.01); *B65D 75/5861* (2013.01); *B29C 2045/14147* (2013.01); *B29C 45/36* (2013.01); *B29L 2031/565* (2013.01); *B65D 2575/586* (2013.01)

(58) Field of Classification Search
  CPC ........ B29C 45/261; B29C 2045/14147; B29C 45/36; B29C 45/26; B29L 2031/565
  See application file for complete search history.

(56) References Cited

U.S. PATENT DOCUMENTS

| 2006/0266775 | A1 | 11/2006 | Niwa |
| 2009/0008416 | A1 | 1/2009 | Kurosawa et al. |
| 2017/0121085 | A1 | 5/2017 | Ichikawa et al. |
| 2019/0039800 | A1 | 2/2019 | Takagi et al. |

FOREIGN PATENT DOCUMENTS

| CN | 106458374 A | 2/2017 |
| JP | 2008-87786 A | 4/2008 |
| JP | 2012-162272 A | 8/2012 |
| JP | 2013-095487 A | 5/2013 |
| JP | 2017-141061 A | 8/2017 |
| JP | 2019-031328 A | 2/2019 |
| WO | 2007/102566 A1 | 9/2007 |
| WO | 2019/106905 A1 | 6/2019 |

OTHER PUBLICATIONS

International Search Report of PCT/JP2020/044583 dated Jan. 26, 2021 [PCT/ISA/210].

\* cited by examiner

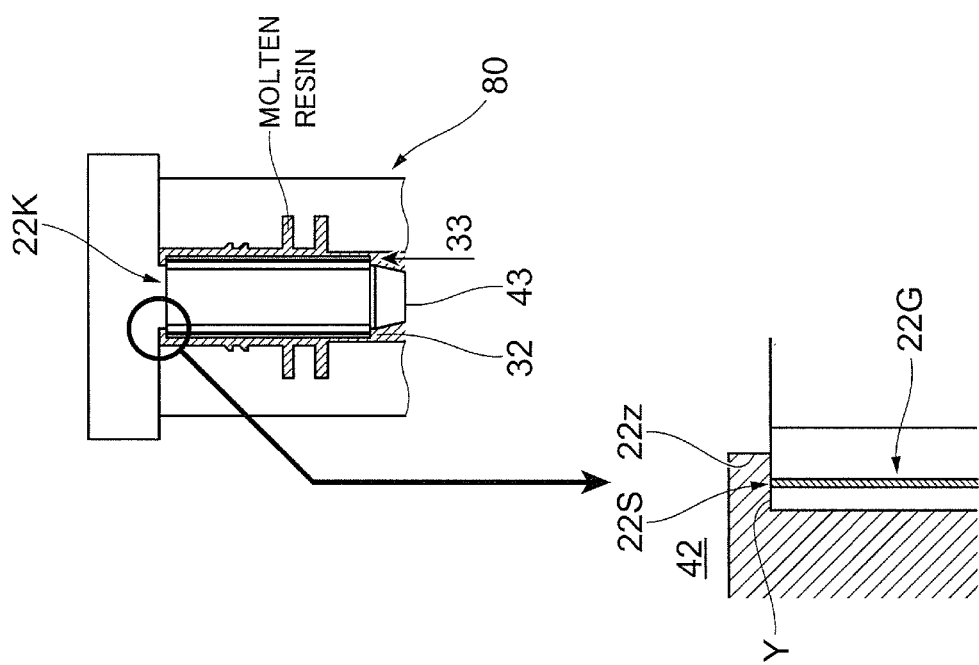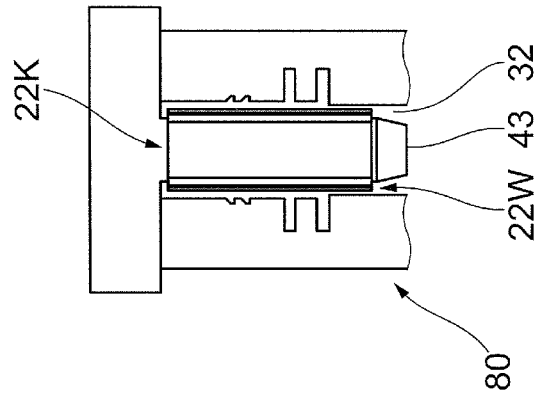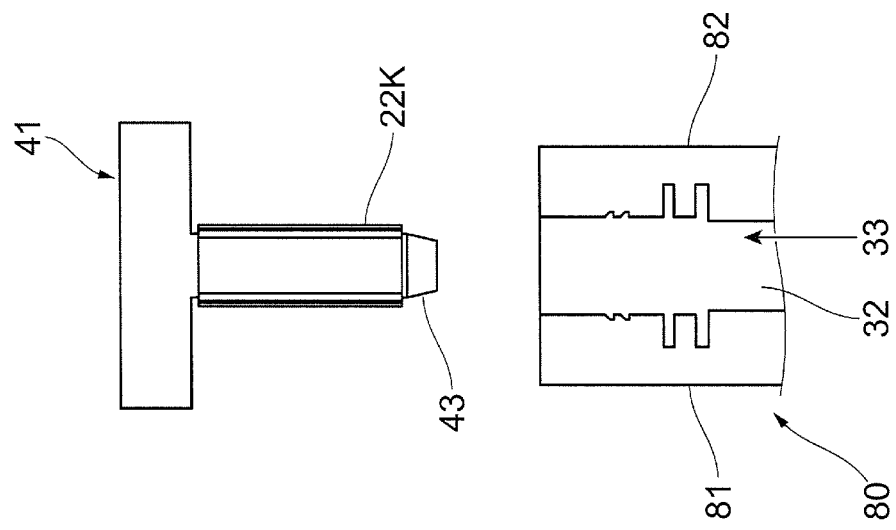

DISCHARGE MEMBER, ACCOMMODATING CONTAINER, METHOD FOR MANUFACTURING DISCHARGE MEMBER, MOLD FOR INJECTION MOLDING, AND DISCHARGE MEMBER WITH CLOSING MEMBER

CROSS REFERENCE TO RELATED APPLICATIONS

This application is a National Stage of International Application No. PCT/JP2020/044583 filed on Dec. 1, 2020, claiming priority based on Japanese Patent Application No. 2019-221740 filed on Dec. 6, 2019.

TECHNICAL FIELD

The present invention relates to a discharge member, an accommodating container, a method for manufacturing the discharge member, a mold for injection molding, and a discharge member with a closing member.

BACKGROUND ART

Conventionally, a configuration in which a discharge member is attached to a container accommodating contents, and the contents accommodated in the container are discharged to the outside of the container through the discharge member has been known.

Patent Document 1 discloses a configuration in which a resin layer has oxygen permeability of 10000 mL·μm/m²·24 hrs·MPa (23° C.·65% RH) or less and water vapor permeability of 1000 g·μm/m²·24 hrs (38° C.·90% RH) or less, and the cylindrical molded body forms an injection flow channel for spouting a content in the container to the outside.

CITATION LIST

Patent Literature

Patent Document 1: Japanese Patent Application Laid-Open Publication No. 2017-141061

SUMMARY OF THE INVENTION

Technical Problem

There are the cases in which a discharge member is attached to a container accommodating contents, and the contents accommodated in the container are discharged to the outside of the container through the discharge member.

Here, if the functional resin layer is provided to the discharge member, for example, components or light rays that can affect the contents are less likely to pass through the discharge member; thereby the quality of the contents accommodated in the container can be maintained for a longer period of time. On the other hand, depending on the location of the functional resin layer, for example, it is also assumed that the functional resin layer is affected by moisture, to thereby reduce the function of the functional resin layer, and accordingly, it becomes difficult to maintain the quality of the contents.

An object of the present invention is to suppress a decrease in function of the functional resin layer, and to maintain the quality of the contents accommodated in the container for a longer period of time.

Solution to Problem

A discharge member to which the present invention is applied is a discharge member used for discharging contents accommodated in a container, the discharge member including: an attachment part to be attached to the container; and a tubular part formed into a tubular shape, through which the contents from the container pass, and provided with a tubular member inside in a radial direction, the tubular member including a functional resin layer disposed as an intermediate layer, wherein the functional resin layer provided to the tubular member is disposed closer to an outer circumferential surface of the tubular member among the outer circumferential surface and an inner circumferential surface of the tubular member.

Here, when the contents pass through the tubular part, the contents may move in one direction toward one end portion of the tubular part in an axial direction, the tubular part may be provided with a tubular part main body outside of the tubular member in the radial direction, the tubular part main body being formed into a tubular shape and supporting the tubular member, and, when positions of a downstream side end surface of the tubular part main body positioned at a downstream side in the one direction and a downstream side end surface of the tubular member positioned at a downstream side in the one direction are compared, the downstream side end surface of the tubular member may be positioned closer to other end portion of the tubular part in the axial direction than the downstream side end surface of the tubular part main body.

In addition, the functional resin layer may be formed along an axial direction of the tubular member and provided to reach the downstream side end surface of the tubular member, and a portion of the downstream side end surface of the tubular member, which is reached by the functional resin layer, may be covered with a resin layer disposed to face the downstream side end surface.

Moreover, the tubular member may have an upstream side end surface on an opposite side of the downstream side end surface, the functional resin layer may be provided to reach the upstream side end surface of the tubular member, and a portion of the upstream side end surface of the tubular member, which is reached by the functional resin layer, may be covered with a resin layer that is disposed to face the upstream side end surface.

Moreover, the functional resin layer disposed as the intermediate layer may have oxygen permeability lower than oxygen permeability of another layer positioned inside the functional resin layer, and the oxygen permeability may be lower than oxygen permeability of another layer positioned outside the functional resin layer, thus the functional resin layer being a layer suppressing oxygen permeation.

Moreover, in the case where the present invention is regarded as an accommodating container, an accommodating container to which the present invention is applied may include: a container accommodating contents; and a discharge member attached to the container to be used for discharging the contents in the container, wherein the discharge member is configured to include the discharge member according to any one of those described above.

Moreover, in the case where the present invention is regarded as a method for manufacturing a discharge member, a method of manufacturing a discharge member to which the present invention is applied may be a method for manufacturing a discharge member used for discharging contents accommodated in a container and provided with a tubular member with an inner circumferential surface and an outer circumferential surface, the tubular member including a functional resin layer disposed as an intermediate layer, the method including: an attachment process of attaching the tubular member to a core pin including a large diameter part on a base end side by attaching the tubular member, in which the functional resin layer is disposed as the intermediate layer and the functional resin layer is disposed closer to the outer circumferential surface, from a tip end side of the core pin and by causing the tubular member to hit against a surface of the large diameter part, the surface extending along a radial direction of the core pin; and a filling process of filling a space around the core pin, which is in a state where the tubular member is attached thereto, with molten resin.

Here, the surface extending along the radial direction may extend in a direction orthogonal to an axial direction of the core pin, and, in the attachment process, the tubular member may be caused to hit against the surface extending along the direction orthogonal to the axial direction of the core pin.

In addition, an outer diameter of the large diameter part may be smaller than an outer diameter of the tubular member, and a part of an end surface of the tubular member may be caused to hit against the surface extending along the radial direction.

Moreover, the large diameter part may be provided with a second surface connected to a first surface, which is the surface extending along the radial direction, the second surface extending along a direction separating from the end surface of the tubular member, in the filling process, a space around the second surface extending along the separating direction may also be filled with the molten resin, and the second surface extending along the separating direction may be disposed along the axial direction of the core pin, or may be formed in a state of being inclined in a direction separating from an axial center of the core pin as moving toward the base end side of the core pin.

Moreover, the outer diameter of the larger diameter part may be smaller than an inner diameter of the functional resin layer.

Moreover, the outer diameter of the large diameter part may be smaller than the outer diameter of the tubular member, and, when the end surface of the tubular member is caused to hit against the first surface, which is the surface extending along the radial direction, a portion of the tubular member, which is positioned inside the functional resin layer in the radial direction, may be caused to hit against the first surface, and the functional resin layer may not come into contact with the first surface.

Moreover, the outer diameter of the large diameter part may be smaller than a value obtained by dividing a sum of the outer diameter and an inner diameter of the tubular member by 2.

Moreover, in the case where the present invention is regarded as a mold for injection molding, a mold for injection molding to which the present invention is applied may be a mold for injection molding used for manufacturing a discharge member used for discharging contents accommodated in a container and provided with a tubular member with an inner circumferential surface and an outer circumferential surface, the tubular member including a functional resin layer disposed as an intermediate layer, the mold for injection molding including: a core pin which is formed into a rod shape, which includes a large diameter part on a base end side, the large diameter part having a surface formed to extend along a radial direction, to which the tubular member is attached from a tip end side, the tubular member having the functional resin layer disposed, as the intermediate layer, closer to the outer circumferential surface, where the tubular member attached from the tip end side is caused to hit against the surface extending along the radial direction; and a mold disposed around the core pin to form a space with the core pin to be filled with molten resin.

Moreover, in the case where the present invention is regarded as a discharge member, a discharge member to which the present invention is applied may be a discharge member with a closing member, which is a discharge member used for discharging contents accommodated in a container, the discharge member with a closing member including: a tubular part formed into a tubular shape, through which the contents from the container pass, provided with an annular end surface around an opening formed at one end portion of the tubular part in an axial direction, the tubular part including a functional resin layer disposed as an intermediate layer; and a closing member including an annular contact part coming into contact with the annular end surface to close the opening positioned at the one end portion of the tubular part.

Here, when positions in the radial direction of the tubular part are compared, a contact point where the annular contact part comes into contact with the annular end surface may be positioned closer to an axial center of the tubular part than the functional resin layer.

In addition, the functional resin layer may not reach the end surface of the tubular part, and a resin layer may be provided between an end portion of the functional resin layer closer to the end surface and the end surface with which the contact part comes into contact.

Moreover, in the case where the present invention is regarded as an accommodating container, an accommodating container to which the present invention is applied may include: a container accommodating contents; and a discharge member with a closing member attached to the container to be used for discharging the contents in the container, wherein the discharge member with a closing member is configured to include the discharge member with a closing member according to any one of those described above.

Advantageous Effects of Invention

According to the present invention, it is possible to suppress a decrease in function of the functional resin layer, and to maintain the quality of the contents accommodated in the container for a longer period of time.

BRIEF DESCRIPTION OF DRAWINGS

FIGS. 6A to 6C are diagrams showing a manufacturing process of the discharge member;

DESCRIPTION OF EMBODIMENT

Hereinafter, an exemplary embodiment according to the present invention will be described in detail with reference to attached drawings.

Figure 1:
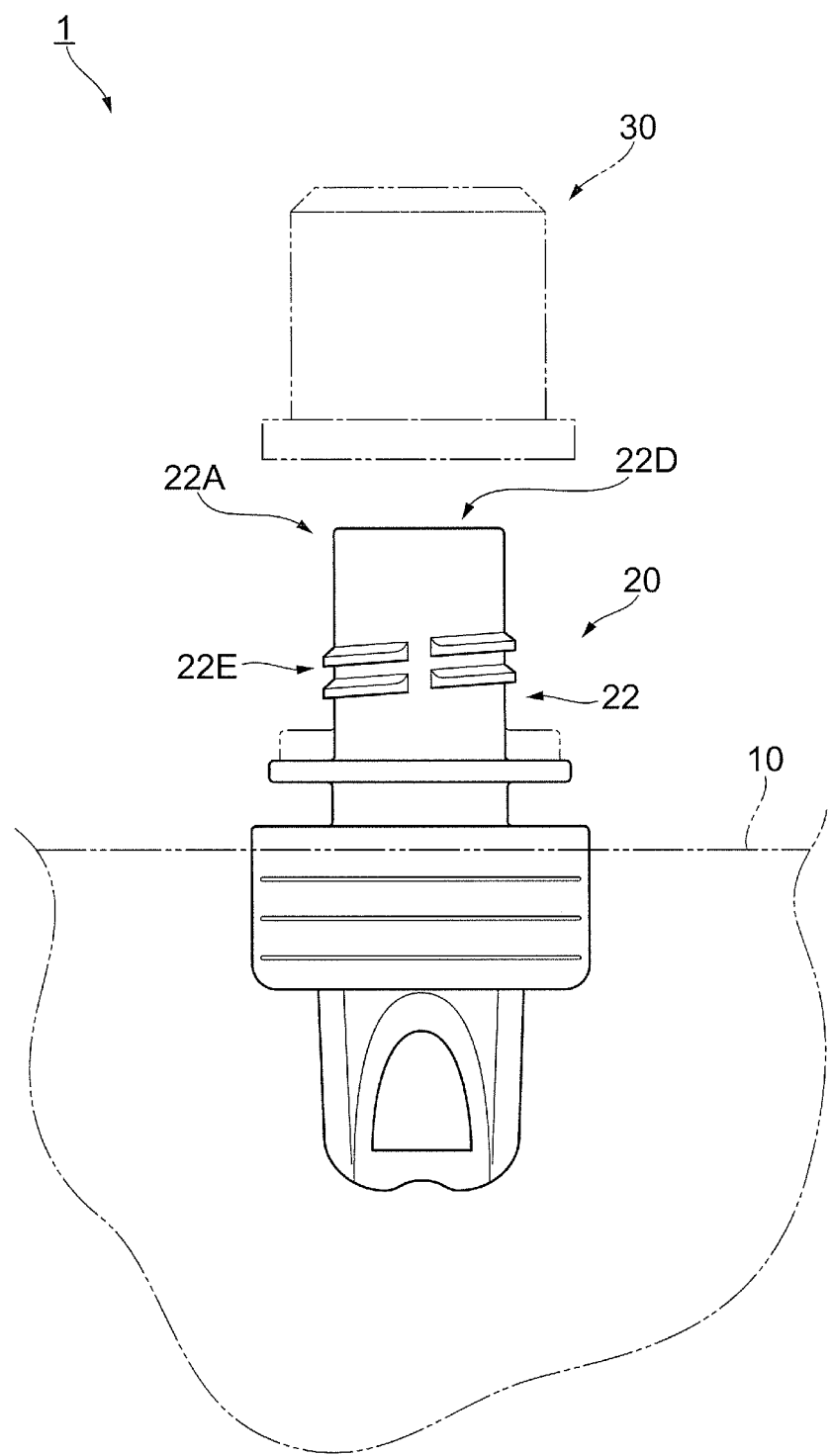
FIG. 1 is a diagram showing an accommodating container related to the exemplary embodiment.

FIG. 1 is a diagram showing an accommodating container 1 related to the exemplary embodiment.

The accommodating container 1 of the exemplary embodiment is provided with: a container 10; a discharge member 20; and a closing member (cap) 30.

The container 10 is configured with a sealed bag. More specifically, the container 10 is formed by a laminate film in which a resin film and a material with a high gas barrier property (low oxygen permeability and water vapor permeability), such as aluminum, are laminated.

The discharge member 20 is a molded article made of a resin material. The discharge member 20 is attached to the container 10. The discharge member 20 is the member through which contents accommodated in the container 10 pass when the contents are to be discharged to the outside of the container 10. In the exemplary embodiment, the contents in the container 10 are discharged to the outside of the accommodating container 1 by passing through the discharge member 20 attached to the container 10.

Here, examples of the contents include fluids (highly viscous liquids) such as jelly drinks, fruit purée, baby food, and ketchup, and liquids (less viscous liquids) such as water and juice. In addition, the contents are not limited to food, and may be other than food.

The closing member 30 is a member with a function that restricts movement of the contents to pass through openings provided in the discharge member 20; in the exemplary embodiment, the closing member 30 closes the openings provided in the discharge member 20, to thereby restrict movement of the contents (restrict discharge of the contents to the outside of the container 10).

Figure 2:
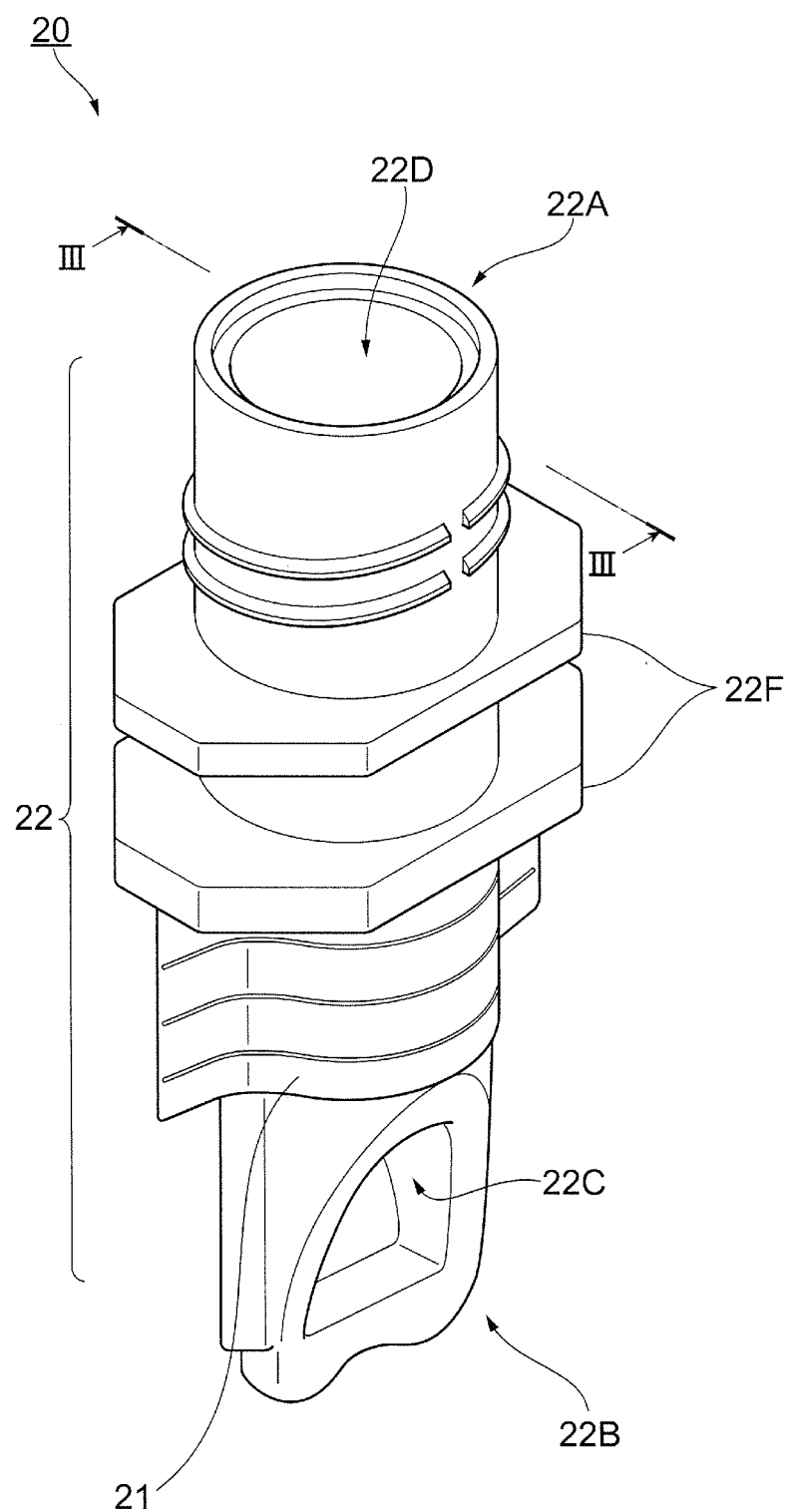
FIG. 2 is a diagram illustrating a discharge member.

FIG. 2 is a diagram illustrating the discharge member 20.

The discharge member 20 is provided with an attachment part 21 to be attached to the container 10 (refer to FIG. 1).

The attachment part 21 refers to a point of the discharge member 20, which is attached to the container 10. The attachment part 21 is inserted into the container 10 (refer to FIG. 1). In addition, in the exemplary embodiment, the inner surface of the container 10 is fixed to the attachment part 21 by so-called welding.

Further, the discharge member 20 is provided with a cylinder-shaped tubular part 22.

The tubular part 22 refers to a portion in which a through hole is formed to have a hollow shape. In the exemplary embodiment, when the contents are discharged from the container 10, the contents from the container 10 pass through the tubular part 22.

More specifically, in the exemplary embodiment, when the contents pass through the tubular part 22, the contents are directed toward the one end portion 22A of the tubular part 22 in the axial direction thereof, and discharged from the one end portion 22A side.

More specifically, in the exemplary embodiment, when the contents pass through the tubular part 22, the contents enter into the tubular part 22 from the other end portion 22B side in the axial direction thereof, and thereafter, discharged from the one end portion 22A side in the axial direction of the tubular part 22.

Still more specifically, in the exemplary embodiment, an opening 22C (hereinafter referred to as "other end portion side opening 22C") is formed on the other end portion 22B side of the tubular part 22, and in the exemplary embodiment, the contents enter into the tubular part 22 through the other end portion side opening 22C.

Then, after passing through the inside of the tubular part 22, the contents reach an opening 22D positioned at the one end portion 22A of the tubular part 22 (hereinafter referred to as "one end portion side opening 22D"), and are discharged to the outside of the tubular part 22 from the one end portion side opening 22D.

In addition, in the exemplary embodiment, the closing member 30 is provided as shown in FIG. 1; the closing member 30 is attached to the one end portion 22A side of the tubular part 22 to close the one end portion side opening 22D.

In the exemplary embodiment, as shown in FIG. 1, a screw part 22E is provided on the outer circumferential surface of the tubular part 22, and another screw part (not shown) is also provided on the inner circumferential surface of the closing member 30.

In the exemplary embodiment, the closing member 30 is detachably fastened to the tubular part 22 by the screw parts provided to both the tubular part 22 and the closing member 30.

Further, in the exemplary embodiment, as shown in FIG. 2, protrusion parts 22F protruding from the outer circumferential surface of the tubular part 22 are provided. Two protrusion parts 22F are provided.

The protrusion parts 22F are disposed along the radial direction of the tubular part 22, and formed into a plate shape. Further, the two protrusion parts 22F are disposed with a gap therebetween.

Figure 3:
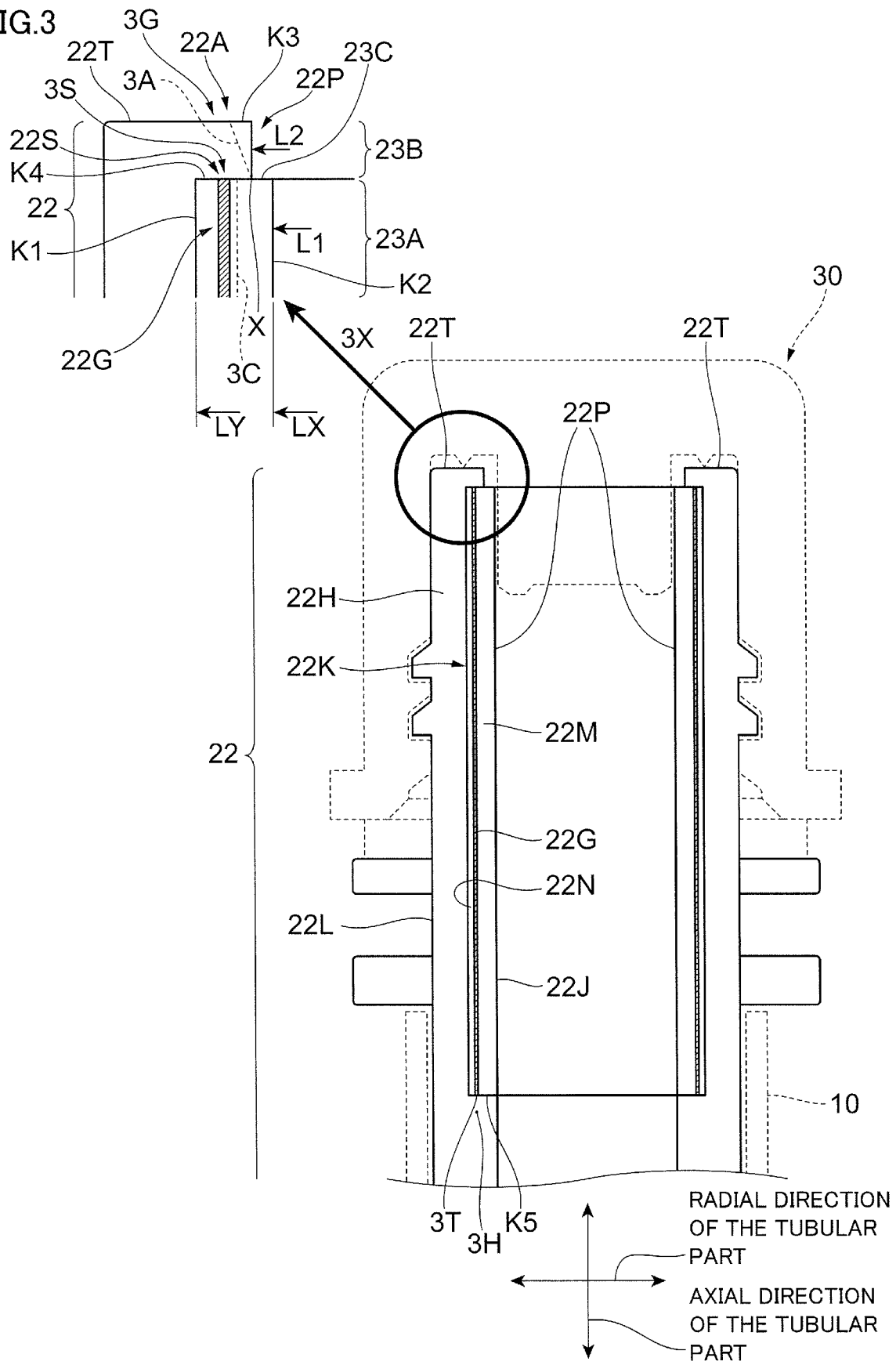
FIG. 3 is a cross-sectional view along the III-III line in FIG. 2.

FIG. 3 is a cross-sectional view along the III-III line in FIG. 2.

In the tubular part 22 of the exemplary embodiment, a functional resin layer 22G is disposed as an intermediate layer. The functional resin layer 22G is formed into a tubular shape, and disposed coaxially with the tubular part 22. In addition, the functional resin layer 22G is disposed along the axial direction of the tubular part 22.

More specifically, in the exemplary embodiment, the tubular part 22 is provided with a tubular part main body 22H and a tubular member 22K disposed inside the tubular part main body 22H.

The tubular member 22K is a member in which a through hole is formed to be hollow, and in the exemplary embodiment, the contents pass through the hollow portion. In addition, the tubular part main body 22H is a portion serving as a base of the tubular part 22; in the exemplary embodiment, the tubular member 22K is supported by the tubular part main body 22H.

In the exemplary embodiment, the tubular member 22K is provided inside in the radial direction of the tubular part 22. Moreover, in the exemplary embodiment, the tubular part 22 is provided with the tubular part main body 22H on the outside in the radial direction of the tubular member 22K, which is formed into the tubular shape and supports the tubular member 22K.

In the exemplary embodiment, the tubular member 22K is provided with the functional resin layer 22G.

More specifically, in the exemplary embodiment, a molten resin is charged around the tubular member 22K to form the tubular part main body 22H, as will be described later.

In this case, when the molten resin is charged, the outer circumferential surface of the tubular member 22K is melted. In this case, thereafter, when the molten resin is cured, the tubular member 22K and the tubular part main body 22H formed by curing the molten resin are fixed to each other, and thereby the tubular member 22K and the tubular part main body 22H are integrated.

In the exemplary embodiment, as the functional resin layer 22G, a layer suppressing permeation of oxygen is provided. More specifically, in the exemplary embodiment, a layer composed of ethylene-vinyl alcohol copolymer resin (EVOH) is provided as the functional resin layer 22G.

The tubular member 22K is also provided with an inner layer 22M, as an example of other layers located inside the functional resin layer 22G, and an outer layer 22N, as an example of other layers located outside the functional resin layer 22G.

The inner layer 22M and the outer layer 22N are made of resin, such as polyethylene or polypropylene.

Examples of polyethylene can include low density polyethylene (LDPE), medium density polyethylene (MDPE), high density polyethylene (HDPE), and linear low density polyethylene (LLDPE). Among these, HDPE or PP is preferred because of excellent water vapor permeability and rigidity.

By selecting HDPE or PP, the water vapor permeability of the discharge member 20 reduced (it becomes difficult for the water vapor to pass through), and thereby reduction of gas barrier properties of the functional resin layer 22G due to the effects of moisture contained in the contents and water in the outside air can be prevented.

Further, in the case where retort sterilization is performed after the accommodating container 1 is filled with the contents, it is required to select the resin for the inner layer 22M, the outer layer 22N, and an adhesive layer depending on the sterilization temperature.

In the case of boil sterilization at a sterilization temperature of less than 100° C. and retort sterilization at a sterilization temperature of 100° C. or more and less than 120° C., both PE and PP can be used. On the other hand, in the case of retort sterilization at a sterilization temperature of 120° C. or more, it is preferable to select PP-based resin in relation to the heat resistance of the resin.

Here, the oxygen permeability of ethylene-vinyl alcohol copolymer resin (EVOH) (the oxygen permeability of the functional resin layer 22G) is smaller (lower) than that of resin, such as polyethylene or polypropylene; in the exemplary embodiment, the functional resin layer 22G functions as a gas barrier layer that mainly suppresses permeation of gases, such as oxygen.

Note that, in the exemplary embodiment, the tubular part main body 22H is also composed of polyethylene or polypropylene resin.

In addition, though the illustration is omitted, the adhesive layer (adhesive resin) that bonds the functional resin layer 22G and the outer layer 22N is provided between the functional resin layer 22G and the outer layer 22N.

Moreover, between the functional resin layer 22G and the inner layer 22M, an adhesive layer bonding the functional resin layer 22G and the inner layer 22M is provided.

As the adhesive resin that forms the adhesive layer, a polyolefin-based adhesive resin, which chemically binds monobasic unsaturated fatty acid such as acrylic acid or methacrylic acid, an ester compound of monobasic unsaturated fatty acid such as methyl acrylate, methyl methacrylate, or glycidyl methacrylate, or anhydride of dibasic fatty acid such as maleic acid, fumaric acid, or itaconic acid to an ethylene-based resin such as linear low-density polyethylene (LLDPE), low-density polyethylene (LDPE), and an ethylene-vinyl acetate copolymer (EVA), or a propylene-based resin such as a propylene homopolymer or a copolymer between propylene and other α-olefin, is suitably used.

Specific examples of adhesive resin include the trade name "ADMER" manufactured by Mitsui Chemicals, Inc., and the trade name "Modic" manufactured by Mitsubishi Chemical Corporation.

The tubular member 22K of the exemplary embodiment includes the outer layer 22N, the adhesive layer, the functional resin layer 22G, the adhesive layer, and the inner layer 22M, which forms five-layer structure.

The thickness of the functional resin layer 22G is preferably from 10 μm to 300 μm, and more preferably from 20 μm to 250 μm. The thickness of the outer layer 22N is preferably from 50 μm to 300 μm, and more preferably from 100 μm to 250 μm. The thickness of the inner layer 22M is preferably from 150 μm to 500 μm, and more preferably from 200 μm to 400 μm. The thickness of the adhesive layer is preferably from 10 μm to 50 μm, and more preferably from 15 μm to 40 μm.

In addition, it is necessary that the thickness of the inner layer 22M is the thickest among at least the layers forming the tubular member 22K. It is also preferable that the thickness of the inner layer 22M is at least 1.3 times the thickness of the outer layer 22N.

The thick inner layer 22M reduces the water vapor permeability and prevents reduction of the gas barrier properties of the functional resin layer 22G upon being affected by the humidity of the contents.

In addition, the tubular member 22K of the exemplary embodiment is formed by the so-called extrusion molding. More specifically, the long-length member formed by the extrusion molding is cut in a predetermined length to form the tubular member 22K.

More specifically, in the exemplary embodiment, the entire accommodating container 1 after the contents are accommodated is sterilized by vapor and hot water in some cases, where the accommodating container 1 is exposed to moisture.

In this case, if the outer layer 22N and inner layer 22M are small in thickness, it is easier for moisture to reach the functional resin layer 22G by passing through the outer layer 22N and the inner layer 22M.

In this case, since the functional resin layer 22G is vulnerable to moisture, if the functional resin layer 22G is affected by moisture, the function thereof is reduced, and the oxygen permeability is likely to increase. In contrast thereto, if the thickness of the functional resin layer 22G is not increased, and the outer layer 22N and inner layer 22M are large in thickness, moisture is less likely to reach the functional resin layer 22G, and the performance of the functional resin layer 22G is maintained.

Note that, in the exemplary embodiment, a layer configured with the ethylene-vinyl alcohol copolymer resin was provided as the functional resin layer 22G; however, the layer is not limited thereto, and, for example, a layer configured with polyvinyl alcohol (PVA) may be provided as the functional resin layer 22G. In this case, similarly, permeation of oxygen can be suppressed.

In addition, as the functional resin layer 22G, a layer configured with polyvinylidene chloride (PVDC) or a layer configured with metal material, such as aluminum, may be provided.

Moreover, in the exemplary embodiment, description was given of the case in which the layer suppressing permeation of oxygen was provided as the functional resin layer 22G as an example; however, the layer is not limited thereto, and, for example, a layer suppressing transmission of light, such as ultraviolet light, may be provided.

As in the exemplary embodiment, if the functional resin layer 22G that suppresses permeation of oxygen is provided to the tubular part 22, the movement of oxygen from the outside of the tubular part 22 to the inside of the tubular part 22 can be suppressed. In addition, entry of oxygen from the outside of the accommodating container 1 into the tubular part 22 can be suppressed.

This prevents the contents from oxidizing inside the tubular part 22. Note that, in the exemplary embodiment, the container 10 is provided with a material having high gas barrier properties, such as aluminum, as described above; accordingly, in the container 10, permeation of oxygen can be suppressed by the material having high gas barrier properties.

Moreover, in the exemplary embodiment, as indicated by the reference sign 3X in FIG. 3, a first inner diameter part 23A having a first diameter L1 is provided on the inner circumferential surface 22P of the tubular part 22 and at the tip end portion of the tubular part 22.

In addition, a second inner diameter part 23B is provided closer to the one end portion 22A of the tubular part 22 than the first inner diameter part 23A.

The second inner diameter part 23B has a second diameter L2 that is larger than the first diameter L1.

Further, in the exemplary embodiment, a connection plane 23C is provided to connect the first inner diameter part 23A and the second inner diameter part 23B.

More specifically, the connection plane 23C is provided to connect an end portion of the first inner diameter part 23A (the end portion positioned closer to the one end portion 22A of the tubular part 22) and an end portion of the second inner diameter part 23B (the end portion positioned closer to the other end portion 22B (refer to FIG. 2) of the tubular part 22).

The connection plane 23C is disposed to extend along the radial direction of the tubular part 22. More specifically, the connection plane 23C extends along the direction orthogonal to the axial direction of the tubular part 22.

In addition, in the exemplary embodiment, a portion of the inner circumferential surface 22P of the tubular part 22, which is positioned at the first inner diameter part 23A, is formed along the axial direction of the tubular part 22.

In the exemplary embodiment, a portion of the inner circumferential surface 22P of the tubular part 22, which is positioned at the second inner diameter part 23B, is also formed along the axial direction of the tubular part 22.

Note that the portion of the inner circumferential surface 22P of the tubular part 22, which is positioned at the second inner diameter part 23B, may be inclined to the outside direction in the radial direction of the tubular part 22 with a move toward the one end portion 22A of the tubular part 22, as indicated by the broken line 3A.

Furthermore, in the exemplary embodiment, in the case where the positions of the tubular part 22 in the radial direction are compared, the functional resin layer 22G is located outward in the radial direction of the tubular part 22 as compared to a connection portion X between the connection plane 23C and the second inner diameter part 23B.

In addition, in the exemplary embodiment, in the case where the positions of the tubular part 22 in the axial direction are compared, an end portion 22S of the functional resin layer 22G, which is positioned closer to the one end portion 22A, is positioned closer to the other end portion 22B (refer to FIG. 2) of the tubular part 22 than an end surface 22T of the tubular part 22, which is positioned closer to the one end portion 22A.

Moreover, in the exemplary embodiment, as indicated by the reference sign 3X in FIG. 3, the functional resin layer 22G provided to the tubular member 22K is disposed closer to the outer circumferential surface K1 among the outer circumferential surface K1 and the inner circumferential surface K2 of the tubular member 22K.

In the exemplary embodiment, the functional resin layer 22G is positioned outside in the radial direction of a virtual circle 3C that has a diameter with a value obtained by adding the diameter LX of the inner circumferential surface K2 and the diameter LY of the outer circumferential surface K1 and then divided by 2.

In addition, in the exemplary embodiment, the thickness of the inner layer 22M is larger than the thickness of the outer layer 22N.

Here, in the exemplary embodiment, the functional resin layer 22G is provided, and thereby movement of oxygen from the outside of the tubular part 22 to the inside of the tubular part 22 can be suppressed. In addition, movement of oxygen from the outside of the accommodating container 1 into the tubular part 22 can also be suppressed.

This prevents the contents from oxidizing inside the tubular part 22.

Further, in the exemplary embodiment, the functional resin layer 22G is disposed closer to the outer circumferential surface K1, which is less likely to be affected by the contents as compared to the case where the functional resin layer 22G is disposed closer to the inner circumferential surface K2.

Here, if the functional resin layer 22G is disposed closer to the inner circumferential surface K2, the thickness of the inner layer 22M is reduced, and thereby the moisture contained in the contents easily reach the functional resin layer 22G through the thin inner layer 22M.

In this case, the oxygen permeability of the functional resin layer 22G is increased. The functional resin layer 22G is susceptible to moisture, and if the functional resin layer 22G is disposed closer to the inner circumferential surface K2, the moisture contained in the contents can easily reach the functional resin layer 22G; accordingly, the oxygen permeability of the functional resin layer 22G is increased.

In contrast thereto, if the functional resin layer 22G is positioned closer to the outer circumferential surface K1 and the inner layer 22M is thicker as in the exemplary embodiment, the functional resin layer 22G is less susceptible to moisture and increase of the oxygen permeability in the functional resin layer 22G can be suppressed.

Further, in the exemplary embodiment, when the contents pass through the tubular part 22, the contents move in one direction (upper side in FIG. 3) toward the one end portion 22A of the tubular part 22 in the axial direction thereof.

Still further, in the exemplary embodiment, the tubular part main body 22H is provided with a downstream side end surface K3. The downstream side end surface K3 is the end surface positioned on the downstream side in the above-described one direction among two end surfaces in the tubular part main body 22H.

In addition, in the exemplary embodiment, the tubular member 22K is also provided with a downstream side end surface K4. The downstream side end surface K4 is the end surface positioned on the downstream side in the above-described one direction among two end surfaces in the tubular member 22K.

Then, in the exemplary embodiment, when the positions of the two downstream side end surfaces K3 and K4 are compared, the downstream side end surface K4 in the tubular member 22K is positioned closer to the other end portion 22B (refer to FIG. 2) of the tubular part 22 than the downstream side end surface K3 in the tubular part main body 22H.

Further, in the exemplary embodiment, the functional resin layer 22G is formed along the axial direction of the tubular member 22K and provided to reach the downstream side end surface K4 of the tubular member 22K.

Furthermore, in the exemplary embodiment, a portion 3S of the downstream side end surface K4 of the tubular member 22K, which is reached by the functional resin layer 22G, is covered with a resin layer 3G that is disposed to face the downstream side end surface K4. More specifically, the portion 3S reached by the functional resin layer 22G is covered with a resin material constituting the tubular part main body 22H.

In addition, in the exemplary embodiment, the tubular member 22K includes an upstream side end surface K5 on the opposite side of the downstream side end surface K4. In the exemplary embodiment, the functional resin layer 22G provided to reach the upstream side end surface K5 of the tubular member 22K.

Further, in the exemplary embodiment, a portion 3T of the upstream side end surface K5 of the tubular member 22K, which is reached by the functional resin layer 22G, is covered with a resin layer 3H that is disposed to face the upstream side end surface K5. More specifically, the portion 3T reached by the functional resin layer 22G is covered with a resin material constituting the tubular part main body 22H.

Note that, in the case where the functional resin layer 22G is disposed closer to the outer circumferential surface K1 and the thickness of the outer layer 22N is smaller than the thickness of the inner layer 22M as in the exemplary embodiment, it is preferable to select the material constituting the outer layer 22N and the material constituting the inner layer 22M so that the shrinkage factor (the shrinkage factor in temperature reduction by a predetermined unit temperature) of the material constituting the outer layer 22N is larger than the shrinkage factor (the shrinkage factor in temperature reduction by a predetermined unit temperature) of the material constituting the inner layer 22M.

As the material constituting the outer layer 22N and the material constituting the inner layer 22M, materials of different kinds may be used, or, for example, materials of the same kinds but the different densities may be used.

In the case where the thickness of the inner layer 22M is larger than the thickness of the outer layer 22N as in the exemplary embodiment, if the same material is used for the inner layer 22M and the outer layer 22N, the extent of deformation of the inner layer 22M becomes larger than the extent of deformation of the outer layer 22N; accordingly, there is a possibility of deformation of the tubular member 22K, such as outward protrusion of a barrel portion of the tubular member 22K.

In contrast thereto, if the shrinkage factor of the material constituting the outer layer 22N is larger than the shrinkage factor of the material constituting the inner layer 22M, the degree of deformation is reduced.

In addition, as another exemplary embodiment, the functional resin layer 22G may be disposed closer to an outer circumferential surface 22L among an inner circumferential surface 22J and the outer circumferential surface 22L of the tubular part 22.

Disposition of the functional resin layer 22G closer to the outer circumferential surface 22L of the tubular part 22 makes the functional resin layer 22G separate further from the contents inside the tubular part 22; thereby the functional resin layer 22G is even less likely to be affected by moisture of the contents.

Note that, in the case where the functional resin layer 22G is disposed closer to the outer circumferential surface 22L of the tubular part 22, for example, the thickness of the tubular part main body 22H is reduced, and the diameter of the outer circumferential surface K1 of the tubular member 22K is increased.

The manufacturing method of the discharge member 20 will be described.

Figure 4:
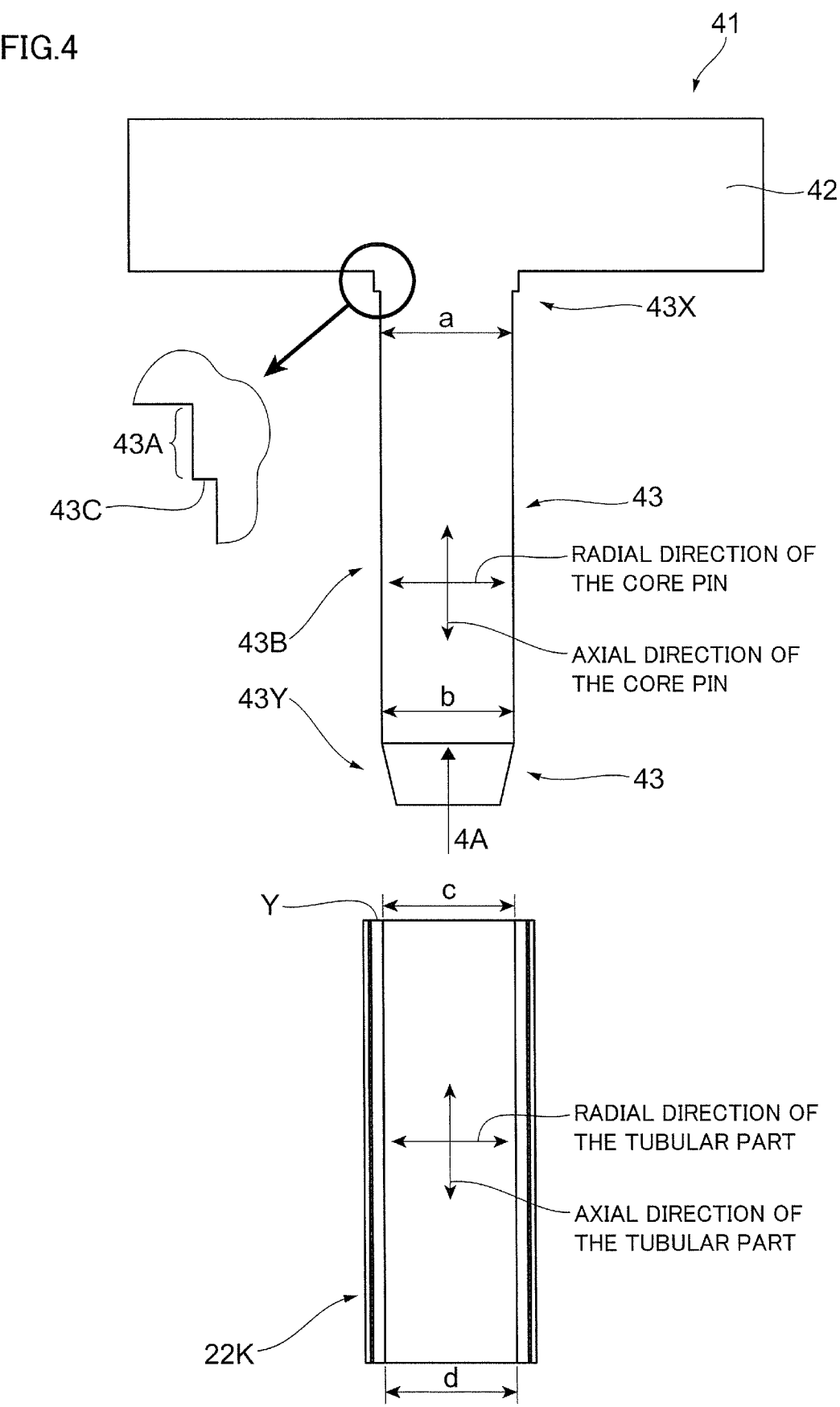
FIG. 4 is a diagram showing a male mold of a mold for injection molding used for molding the discharge member.

FIG. 4 is a diagram showing a male mold 41 of a mold for injection molding used for molding the discharge member 20.

The male mold 41 is provided with a base 42, and a column-shaped core pin 43 protruding from the base 42.

In the exemplary embodiment, a large diameter part 43A is provided on a base end (root) 43X side of the core pin 43, and a small diameter part 43B is provided closer to a tip end portion 43Y of the core pin 43 than the large diameter part 43A. In the exemplary embodiment, the outer diameter of the large diameter part 43A is larger than the outer diameter of the small diameter part 43B.

Here, of the surfaces of the large diameter part 43A, a surface positioned on the tip end portion 43Y side of the core pin 43 (the surface facing toward the tip end portion 43Y of the core pin 43, hereinafter referred to as a "tip end surface 43C") is disposed to extend along the radial direction of the core pin 43.

In the exemplary embodiment, the tip end surface 43C (an example of a first surface), which is a surface constituting a part of the outer surface of the large diameter part 43A, is disposed to extend along the radial direction of the core pin 43. More specifically, the tip end surface 43C is disposed to extend along the direction orthogonal to the axial direction of the core pin 43.

In the exemplary embodiment, in manufacturing the discharge member 20, first, the above-described tubular member 22K is attached to the core pin 43 as indicated by the arrow 4A.

More specifically, in the exemplary embodiment, the tubular member 22K is attached to the core pin 43 from the tip end portion 43Y side of the core pin 43. Still more specifically, the tubular member 22K is attached to the core pin 43 by inserting the core pin 43 into the tubular member 22K.

In addition, in the exemplary embodiment, in attaching the tubular member 22K to the core pin 43, an end surface Y of the tubular member 22K is caused to hit against the above-described tip end surface 43C provided to the large diameter part 43A.

Here, in the exemplary embodiment, the end surface Y of the tubular member 22K is disposed to extend along the radial direction of the tubular member 22K. In other words, the end surface Y of the tubular member 22K is disposed to extend along the direction orthogonal to the axial direction of the tubular member 22K.

Moreover, in the exemplary embodiment, a process of reducing in width towards the tip end (taper process) is applied to the tip end portion 43Y of the core pin 43 (a taper shape is provided to the tip end portion 43Y of the core pin 43); thereby the tubular member 22K can be easily attached to the core pin 43.

In addition, provision of the taper shape to the tip end portion 43Y of the core pin 43 makes the tip end portion 43Y of the core pin 43 less likely to contact the tubular member 22K, thus preventing the tubular member 22K from being cut off. In this case, entry of foreign substances into the contents caused by cutting off the tubular member 22K can be suppressed.

Note that, if it is assumed that the outer diameter of the base end (root) 43X of the core pin 43 (a portion of the base end 43X positioned closer to the tip end portion 43Y than the large diameter part 43A) is the outer diameter a, the outer diameter of the tip end portion 43Y of the core pin 43 (a portion of the tip end portion 43Y, which is positioned closer to the base end 43X than the portion provided with the taper shape) is the outer diameter b, the inner diameter of one end portion of the tubular member 22K (an end portion of the tubular member 22K moving when attached to the core pin 43, the end portion being positioned on the downstream side in the moving direction) is the inner diameter c, and the diameter of the other end portion of the tubular member 22K (an end portion positioned on the upstream side in the moving direction of the tubular member 22K) is the inner diameter d, each of the difference in dimension between the outer diameter a and the inner diameter c and the difference in dimension between the outer diameter b and the inner diameter d should be preferably 0 mm to 0.2 mm, and more preferably 0.05 mm to 0.15 mm.

If the difference in dimension is equal to or less than the lower limit of these ranges, it is difficult or impossible to attach the tubular member 22K to the core pin 43.

Moreover, if the difference in dimension is equal to or more than the upper limit, there is a risk that the molten resin enters between the tubular member 22K and the core pin 43. In this case, there is a possibility that the resin is attached to the inside of the tubular member 22K, and thereafter, the resin falls off to cause contamination by foreign substances.

In addition, to make it easy to attach the tubular member 22K to the core pin 43, the outer surface of the core pin 43 and the inner surface of the tubular member 22K may be tapered to have the outer diameter a>the outer diameter b, the inner diameter c>the inner diameter d.

Here, since the tubular member 22K of the exemplary embodiment is formed by extrusion molding, the inner diameter c=the inner diameter d; however, dimensional relation is not limited thereto, and may have the inner diameter c>the inner diameter d to make it easier to attach the tubular member 22K to the core pin 43.

Figure 5:
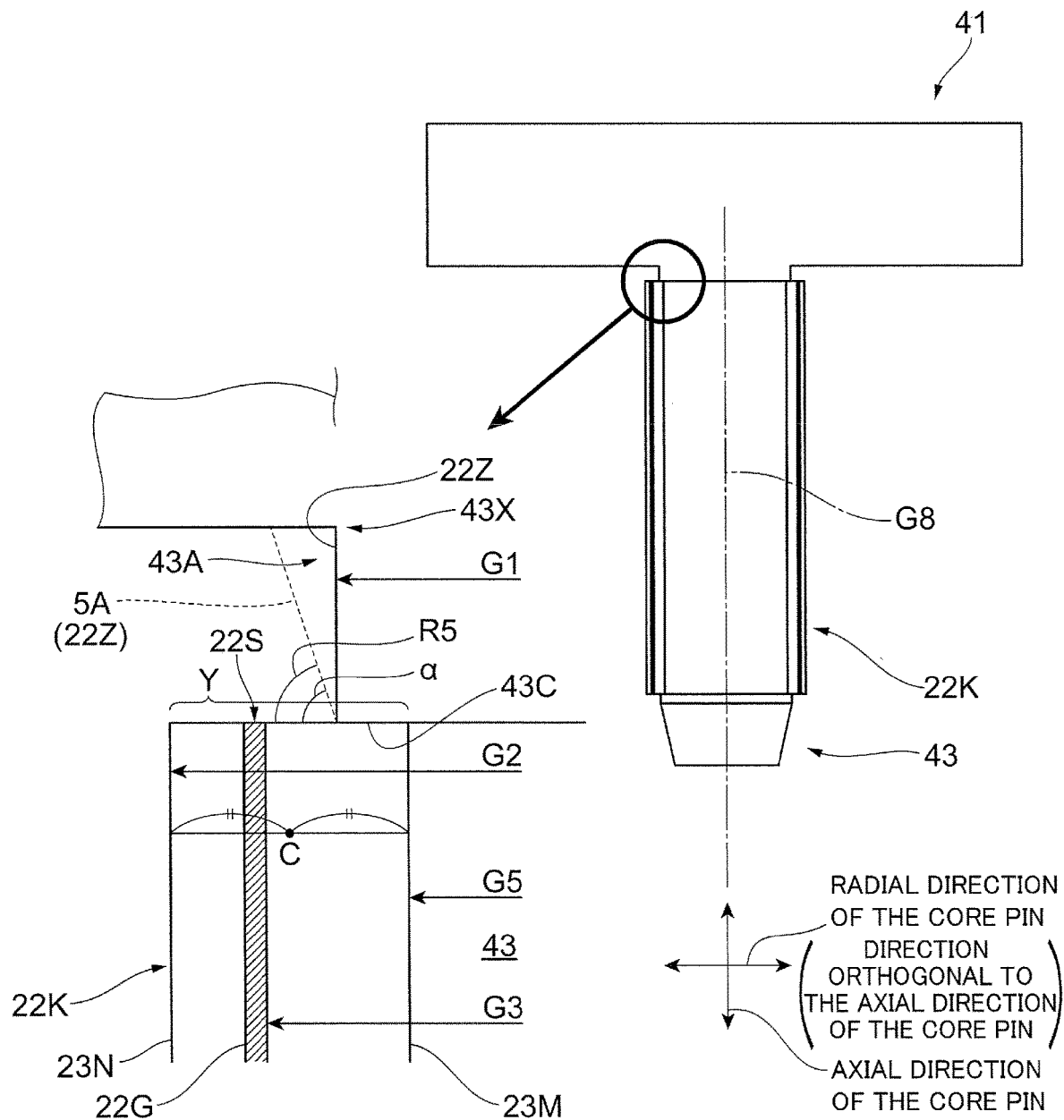
FIG. 5 is a diagram showing a state after the tubular member is attached to a core pin.

FIG. 5 is a diagram showing a state after the tubular member 22K is attached to the core pin 43.

In the exemplary embodiment, as shown in FIG. 5, the outer diameter G1 of the large diameter part 43A is smaller than the outer diameter G2 of the tubular member 22K, and a part of the end surface Y of the tubular member 22K is caused to hit against the tip end surface 43C of the core pin 43.

In the exemplary embodiment, the end surface Y is annularly formed, and a part of the annular end surface Y is caused to hit against the tip end surface 43C of the core pin 43.

To describe further, in the exemplary embodiment, the outer diameter G1 of the large diameter part 43A is smaller than the inner diameter G3 of the functional resin layer 22G provided to the tubular member 22K.

For this reason, in the exemplary embodiment, a portion of the tubular member 22K, which is positioned inside the functional resin layer 22G in the radial direction, is caused to hit against the tip end surface 43C.

In the exemplary embodiment, when the end surface Y of the tubular member 22K is caused to hit against the tip end surface 43C, which is an example of the first surface, the portion of the tubular member 22K, which is positioned inside the functional resin layer 22G in the radial direction, is caused to hit against the tip end surface 43C.

The functional resin layer 22G does not come into contact with the tip end surface 43.

In the exemplary embodiment, the tip end surface 43C is not located at a position facing the end portion 22S of the functional resin layer 22G; therefore, the end portion 22S of the functional resin layer 22G is exposed.

Further, in the exemplary embodiment, the large diameter part 43A of the core pin 43 is provided with an outer circumferential surface 22Z, which is an example of a second surface. The outer circumferential surface 22Z is connected to the tip end surface 43C, which is an example of the first surface.

In addition, the outer circumferential surface 22Z is formed to extend along the direction away from the end surface Y of the tubular member 22K in the state of being attached to the core pin 43.

Moreover, the outer circumferential surface 22Z is formed to head in the direction away from the end surface Y of the tubular member 22K in the case of assuming the connection portion with the tip end surface 43C as a start point.

In addition, the outer circumferential surface 22Z is disposed along the axial direction of the core pin 43.

Note that, not limited to the above, as indicated by the reference sign 5A, the outer circumferential surface 22Z may be inclined in a direction away from the axial center G8 of the core pin 43 as moving toward the base end 43X of the core pin 43.

In this case, as indicated by the broken line 3A in FIG. 3, the portion of the inner circumferential surface 22P of the tubular part 22, which is positioned at the second inner diameter part 23B, is inclined.

In the exemplary embodiment, in a filling process to be described later, the space around the outer circumferential surface 22Z (refer to FIG. 5) is also filled with the molten resin.

Note that, in the case where the outer circumferential surface 22Z of the large diameter part 43A (refer to FIG. 5) is inclined, it is preferable to make the inclination angle α of the outer circumferential surface 22Z (the inclination angle with respect to the direction orthogonal to the axial direction of the core pin 43) larger than 60°.

If the inclination angle is larger than 60°, the tip end angle of the wedge-shaped region R5 formed between the end surface Y of the tubular member 22K and the outer circumferential surface 22Z can be increased, and thereby defects such as difficulty in filling the wedge-shaped region R5 with the molten resin are less likely to be caused.

Further, in the exemplary embodiment, the outer diameter G1 of the large diameter part 43A is smaller than the value obtained by dividing the sum of the outer diameter G2 and the inner diameter G5 of the tubular member 22K by 2.

Consequently, in the exemplary embodiment, the outer circumferential surface 22Z of the large diameter part 43A comes to be positioned closer to the axial center G8 of the core pin 43 than the halfway point C between the inner circumferential surface 23M and the outer circumferential surface 23N of the tubular member 22K.

Here, if the outer diameter G1 of the large diameter part 43A is larger than the value obtained by dividing the sum of the outer diameter G2 and the inner diameter G5 of the tubular member 22K by 2, the outer circumferential surface 22Z of the large diameter part 43A of the core pin 43 comes close to the functional resin layer 22G, and thereby, in some cases, the large diameter part 43A is located at the position facing the end portion 22S of the functional resin layer 22G.

More specifically, the misalignment of the tubular member 22K or the dimensional error of the tubular member 22K is assumed; in this case, the large diameter part 43A can possibly be located at the position facing the end portion 22S of the functional resin layer 22G.

In this case, it is more likely that the end portion 22S of the functional resin layer 22G is not covered with resin. Then, in this case, the end portion 22S of the functional resin layer 22G is exposed, and thereby the functional resin layer 22G is more likely to be susceptible to moisture.

In contrast thereto, if the outer diameter G1 of the large diameter part 43A is made smaller than the value obtained by dividing the sum of the outer diameter G2 and the inner diameter G5 of the tubular member 22K by 2, the large diameter part 43A is less likely to be located at the position facing the end portion 22S of the functional resin layer 22G.

Then, in this case, it is less likely that the end portion 22S of the functional resin layer 22G is not covered with resin.

FIGS. 6A to 6C are diagrams showing the manufacturing process of the discharge member 20.

FIG. 6A shows a female mold 80.

The female mold 80 is configured with a left female mold 81 and a right female mold 82, which can be separated into right and left. A cavity 32 is formed inside the female mold 80.

In addition, the shape of the inner surface of the female mold 80 is the same as the outer shape of the discharge member 20 (refer to FIG. 1). Here, it is preferable that the female mold 80 is provided with plural cavities 32, such as 16 to 48 cavities 32.

In the exemplary embodiment, when the core pin 43 is inserted into the cavity 32 (to be described later), the left female mold 81 and the right female mold 82 are disposed around the core pin 43 to form the space, which will be filled with the molten resin, with the core pin 43.

Moreover, the female mold 80 is provided with a gate 33; in the exemplary embodiment, the molten resin from an injection port of an injection molding machine enters into the cavity 32 through the gate 33.

Further, in the exemplary embodiment, the male mold 41 can advance toward and retreat from the female mold 80, and when the discharge member 20 is to be formed, the male mold 41 is disposed inside the female mold 80.

The discharge member 20 (refer to FIG. 1) is formed by the mold for injection molding and the injection molding machine. Here, the mold for injection molding is configured with the above-described male mold 41 and female mold 80.

In manufacturing the discharge member 20, first, as shown in FIG. 6A, the tubular member 22K is attached to the core pin 43 of the male mold 41 by use of an automatic mounting device such as a robot. At this time, in the exemplary embodiment, the end surface Y (refer to FIG. 5) of the tubular member 22K is caused to hit against the tip end surface 43C (refer to FIG. 5).

Thereafter, in the exemplary embodiment, the core pin 43, to which the tubular member 22K is attached, is put into the cavity 32 of the female mold 80 as shown in FIG. 6B.

Next, as shown in FIG. 6C, the molten resin is injected into the cavity 32 through the gate 33 by use of the injection molding machine. This fills the cavity 32 with the molten resin. In the exemplary embodiment, the space around the core pin 43, to which the tubular member 22K is attached, is filled with the molten resin.

Here, when the molten resin is charged, the tubular member 22K receives pressure from the molten resin, and is biased to the tip end surface 43C provided to the large diameter part 43A (refer to FIG. 5) of the core pin 43.

Here, in the exemplary embodiment, the tip end surface 43C is along the radial direction of the core pin 43; consequently, in the exemplary embodiment, the tubular member 22K is stably supported by the tip end surface 43C.

Figure 7:
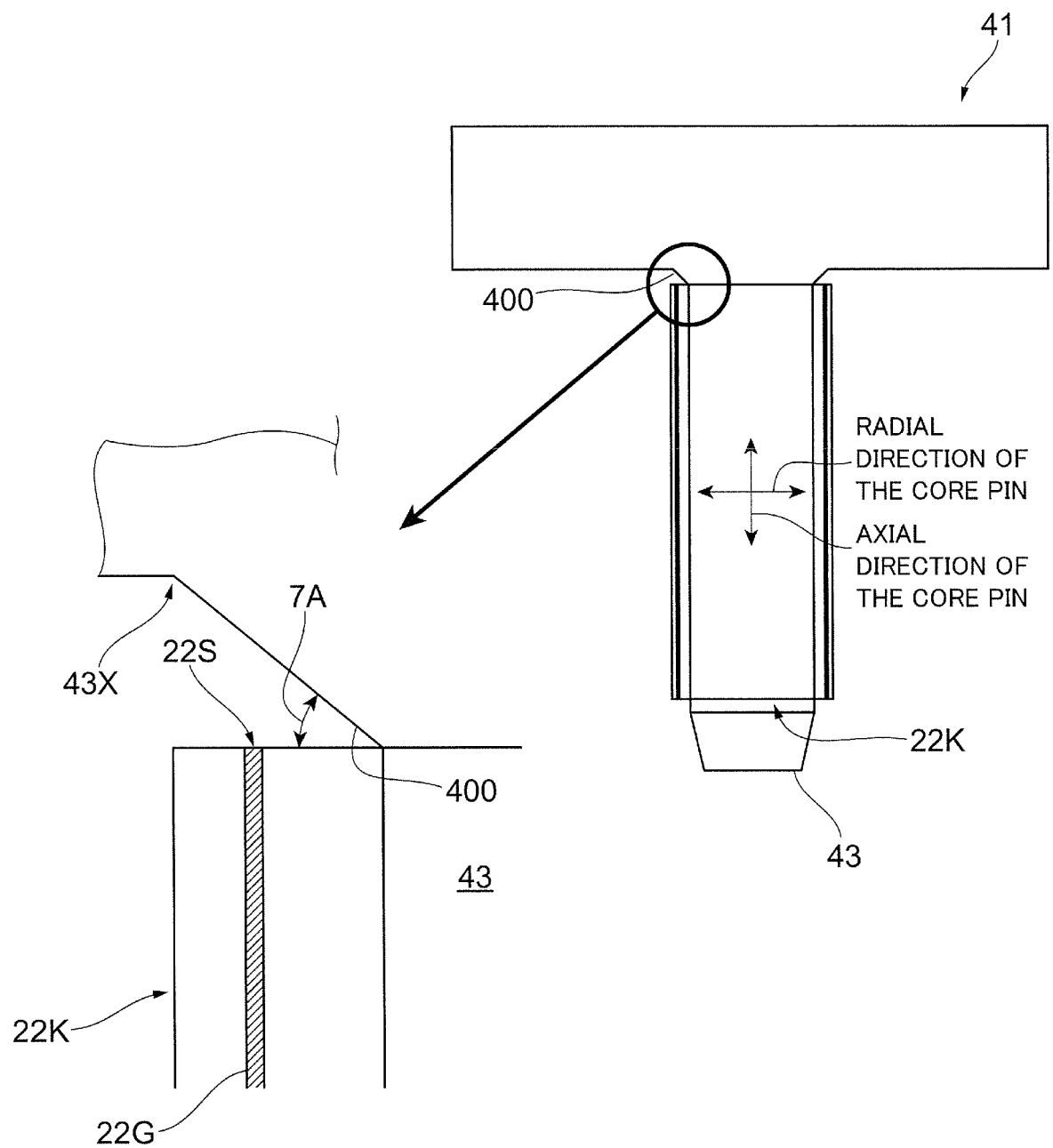
FIG. 7 is a diagram showing a comparative example.

Here, as a comparative example, a mode shown in FIG. 7 (the diagram showing the comparative example) can also be considered. In the comparative example, a surface 400 corresponding to the tip end surface 43C of the exemplary embodiment is inclined.

In this case, the support of the tubular member 22K is likely to be unstable.

More specifically, the tubular member 22K has variation in dimensions; accordingly, in this case, positioning of the tubular member 22K is performed closer to the base end 43X of the core pin 43 than the original position, or positioning of the tubular member 22K is performed in a state in which the tubular member 22K is shifted in the radial direction of the core pin 43.

In addition, if the surface 400 corresponding to the tip end surface 43C is inclined, an acute-angled wedge-shaped region is formed as indicated by the reference sign 7A, and the molten resin is less likely to enter the wedge-shaped region. In this way, if the molten resin is difficult to enter the wedge-shaped region, it is likely that the area originally planned to be filled with the molten resin is not filled.

Then, in this case, there is a possibility that the end portion 22S of the functional resin layer 22G is not covered with resin.

In contrast thereto, in the configuration in which the tubular member 22K is caused to hit against the tip end surface 43C along the radial direction of the core pin 43, as in the exemplary embodiment, misalignment of the tubular member 22K in the axial direction is less likely to occur (movement of the tubular member 22K toward the base end 43X of the core pin 43 is less likely to occur). In this case, the tubular member 22K is stably supported.

In addition, in the exemplary embodiment, as shown in FIG. 5, the outer circumferential surface 22Z of the large diameter part 43A is along the axial direction of the core pin 43, or the inclination angle α of the outer circumferential surface 22Z in relation to the direction orthogonal to the axial direction of the core pin 43 is larger than 60°.

In this case, the wedge-shaped region is not formed, or the tip end angle of the wedge-shaped region R5 (refer to FIG. 5) is increased.

In this case, the above-described defects, in which the area originally planned to be filled with the molten resin is not filled, are less likely to occur. Then, in this case, the end portion 22S of the functional resin layer 22G is covered with resin.

In the exemplary embodiment, when the molten resin filling is carried out, the space around the outer circumferential surface 22Z is also filled with the molten resin as shown in FIG. 6C.

More specifically, the space around the outer circumferential surface 22Z, which is also the space between the base 42 and the end surface Y of the tubular member 22K, is filled with the molten resin.

Thus, in the exemplary embodiment, the end portion 22S of the functional resin layer 22G is covered with resin.

Note that, in the exemplary embodiment, as shown in FIG. 6B, the other end portion 22W of the functional resin layer 22G is also placed inside the cavity 32, and therefore, the other end portion 22W of the functional resin layer 22G is also covered with resin.

Here, if the end portion (one end portion) 22S or the other end portion 22W of the functional resin layer 22G is exposed, the functional resin layer 22G is likely to be susceptible to moisture, and thereby the oxygen permeability of the functional resin layer 22G is increased.

More specifically, in the exemplary embodiment, the entire container 1 after the contents are accommodated is sterilized by vapor and hot water in some cases as described above; in this case, the accommodating container 1 is exposed to moisture.

If the end portion 22S or the other end portion 22W of the functional resin layer 22G is covered with resin as in the exemplary embodiment, the functional resin layer 22G is less susceptible to moisture, and increase of the oxygen permeability in the functional resin layer 22G can be suppressed.

Further, in the exemplary embodiment, when the molten resin filling is performed, the outer circumferential surface 23N of the tubular member 22K (refer to FIG. 5) is melted by the heat from the molten resin.

Consequently, in the exemplary embodiment, when the molten resin is cured later, the tubular part main body 22H (refer to FIG. 3) formed by the cured molten resin and the tubular member 22K are fixed to each other.

In the exemplary embodiment, after a predetermined period of time has passed, the female mold 80 (refer to FIG. 6C) is opened and the finished discharge member 20 is taken out.

Figure 8:
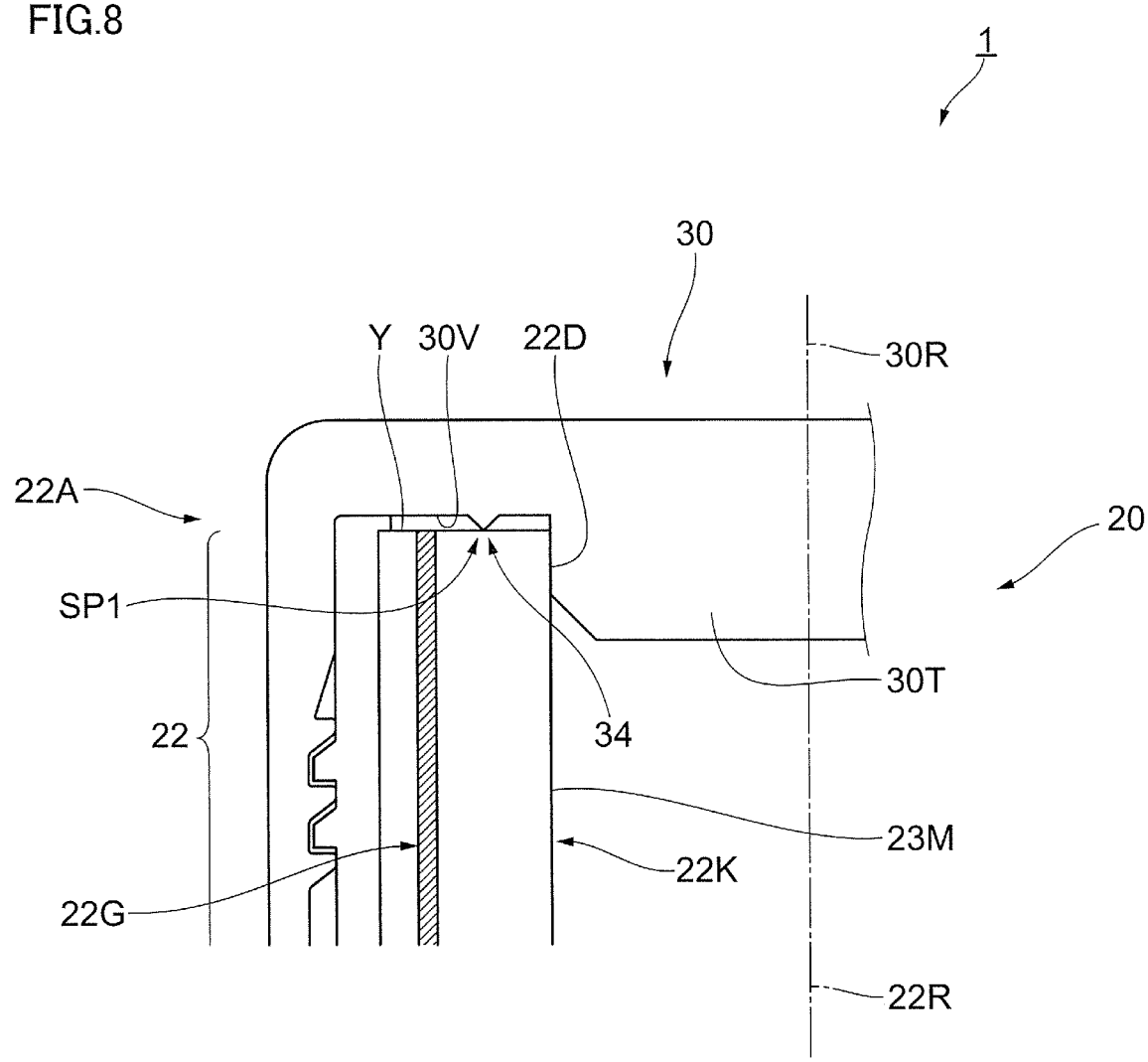
FIG. 8 is a diagram showing another configuration example of the accommodating container.

FIG. 8 is a diagram showing another configuration example of the accommodating container 1.

In the configuration example, the end surface Y of the tubular member 22K is exposed without being covered with resin.

Here, in the configuration example, the discharge member 20 is also manufactured by the same manufacturing method as described above.

However, in manufacturing the discharge member 20 shown in FIG. 8, the thickness of the large diameter part 43A (refer to FIG. 5) provided to the core pin 43 (the thickness of the core pin 43 in the axial direction) is reduced, and the entire surface of the end surface Y of the tubular member 22K is caused to hit against the tip end surface 43C (refer to FIG. 5), and then the molten resin filling is performed.

In the configuration example, similar to the above, the annular end surface Y is provided around the one end portion side opening 22D of the tubular part 22. Moreover, in the configuration example, the end surface Y of the tubular member 22K (the end surface Y positioned closer to the one end portion 22A of the tubular part 22) is exposed without being covered with resin.

Further, in this configuration example, the closing member 30 is provided with an annular contact part 34 that is in contact with the annular end surface Y.

The contact part 34 protrudes from a facing surface 30V of the closing member 30, which faces the end surface Y. Furthermore, the contact part 34 is disposed coaxially with the closing member 30 formed into the cylindrical shape, and is also disposed coaxially with the tubular part 22.

Moreover, in the configuration example, when positions in the radial direction of the tubular part 22 are compared, the contact point SP1, where the annular contact part 34 is in contact with the annular end surface Y, is positioned closer to the axial center 22R of the tubular part 22 than the functional resin layer 22G.

Further, in the configuration example, a columnar protrusion part 30T, which protrudes toward the tubular part 22 and a tip end of which enters inside the tubular part 22, is provided on the axial center 30R of the closing member 30.

As described above, the functional resin layer 22G is susceptible to moisture, and the oxygen permeability is likely to increase when moisture is given to the functional resin layer 22G.

In the configuration example, when the contents inside the tubular part 22 are moved to the position facing the end surface Y of the tubular member 22K, moisture is given to the functional resin layer 22G, and thereby the oxygen permeability of the functional resin layer 22G is likely to increase.

In contrast thereto, since the contact part 34 is provided in the exemplary embodiment, the movement of the contents inside the tubular part 22 is restricted by the contact part 34; accordingly, it is less likely that the contents pass between the end surface Y of the tubular member 22K and the facing surface 30V to reach the functional resin layer 22G.

In the exemplary embodiment, the protrusion part 30T is brought into contact with the inner circumferential surface 23M of the tubular member 22K to also restrict the movement of the contents to the functional resin layer 22G; however, in the exemplary embodiment, provision of the contact part 34 further restricts the movement of the contents to the functional resin layer 22G.

In this case, increase in the oxygen permeability of the functional resin layer 22G is suppressed, and the quality of the contents accommodated in the accommodating container 1 can be maintained for a longer period of time.

Note that the closing member 30 shown in FIG. 8 may be used in the configuration shown in FIGS. 1 to 3.

Figure 9:
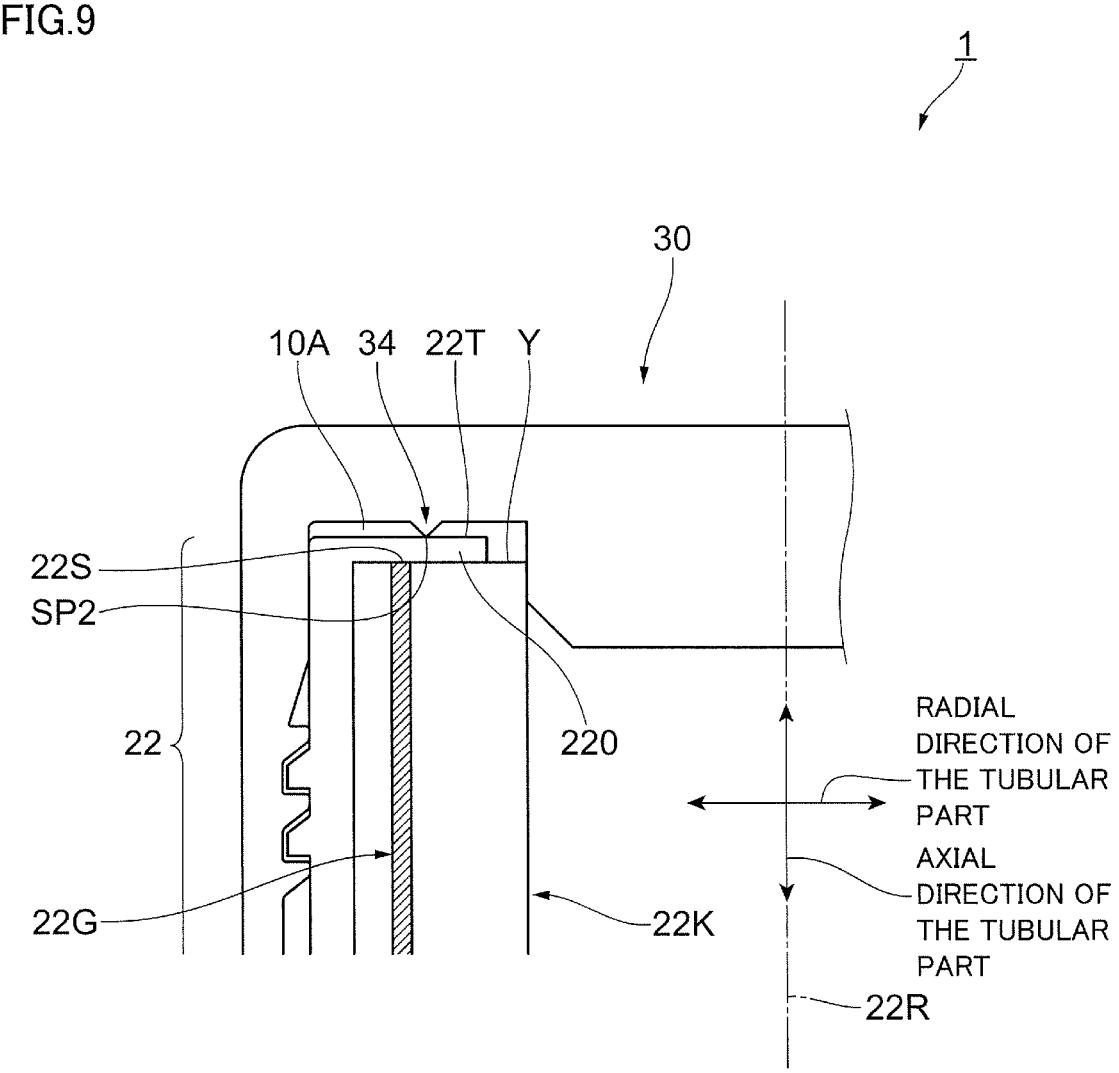
FIG. 9 is a diagram showing still another configuration example of the accommodating container.

If the closing member 30 shown in FIG. 8 is attached to the discharge member 20 shown in FIGS. 1 to 3, a configuration shown in FIG. 9 (a diagram showing still another configuration example of the accommodating container 1) is provided.

In this configuration, unlike the configuration shown in FIG. 8, the contact part 34 does not come into contact with the end surface Y of the tubular member 22K, but the contact part 34 comes into contact with a resin layer 22O formed by curing of the molten resin.

In this configuration shown in FIG. 9, the contact part 34 comes into contact with a portion covering the end surface Y of the tubular member 22K (the resin layer 22O).

In the configuration, the functional resin layer 22G does not reach the end surface 22T of the tubular part 22, and the resin layer 22O covering the end surface Y of the tubular member 22K is provided between the end portion 22S of the functional resin layer 22G and the end surface 22T with which the contact part 34 comes into contact.

Then, in the configuration, the contact part 34 comes into contact with the resin layer 22O covering the end surface Y of the tubular member 22K.

Moreover, in the configuration example, similar to the above, when positions in the radial direction of the tubular part 22 are compared, the contact point SP2, where the annular contact part 34 is in contact with the annular end surface 22T, is positioned closer to the axial center 22R of the tubular part 22 than the functional resin layer 22G.

In this configuration example, movement of the contents to the space indicated by the reference sign 10A (hereinafter referred to as "space 10A") is less likely to occur, and it is difficult to supply moisture to the functional resin layer 22G.

In the configuration example, across the resin layer 22O covering the end surface Y, the space 10A exists on a side opposite to the side where the end portion 22S is positioned; the movement of the contents to the space 10A is less likely to occur.

In this case, as compared to the configuration in which the contents easily reach the space 10A, it is less likely that the functional resin layer 22G is supplied with moisture.

In the exemplary embodiment, it is basically possible to suppress the supply of moisture to the functional resin layer 22G by providing the above-described resin layer 22O, and the supply of moisture to the functional resin layer 22G can further be suppressed by providing the contact part 34.

(Others)

In the exemplary embodiment, the discharge member 20 is manufactured by the processing described in FIG. 6.

Thereafter, in the exemplary embodiment, the manufactured discharge member 20 is attached to the container 10. Then, the container 10 is filled with the contents through the one end portion side opening 22D (refer to FIG. 2) of the discharge member 20. Next, the closing member 30 is attached, and thereby the accommodating container 1 is completed.

In addition, for example, when the discharge member 20 is manufactured, the closing member 30 may be attached to the discharge member 20 first.

In this case, the discharge member 20, to which the closing member 30 was attached, is attached to the container 10 that has been filled with the contents; thereby the accommodating container 1 is completed.

REFERENCE SIGNS LIST

1 Accommodating container
3G Resin layer
3H Resin layer
10 Container
20 Discharge member
21 Attachment part
22 Tubular part
22A One end portion
22B The other end portion
22G Functional resin layer
22H Tubular part main body
22K Tubular member
22R Axial center
22Z Outer circumferential surface
23A First inner diameter part
23B Second inner diameter part
23C Connection plane
30 Closing member
34 Contact part
41 Male mold
43 Core pin
43A Large diameter part
43C Tip end surface
K1 Outer circumferential surface
K2 Inner circumferential surface
K3 Downstream side end surface
K4 Downstream side end surface
K5 Upstream side end surface
Y End surface

The invention claimed is:

1. A discharge member with a closing member comprising:
a discharge member used for discharging contents accommodated in a container; and
a closing member, wherein
the discharge member includes a tubular part formed into a tubular shape, through which the contents from the container pass, provided with an annular end surface around an opening formed at one end portion of the tubular part in an axial direction, the tubular part including a functional resin layer disposed as an intermediate layer; and
the closing member includes an annular contact part coming into contact with the annular end surface to close the opening positioned at the one end portion of the tubular part, and
when positions in a radial direction of the tubular part are compared, a contact point where the annular contact part comes into contact with the annular end surface is positioned closer to an axial center of the tubular part than the functional resin layer.

2. An accommodating container comprising:
the container accommodating contents; and
the discharge member with the closing member attached to the container to be used for discharging the contents in the container, wherein
the discharge member with the closing member is configured to include the discharge member with the closing member according to claim 1.

3. A discharge member with a closing member comprising:
a discharge member used for discharging contents accommodated in a container; and
a closing member, wherein
the discharge member includes
a tubular part formed into a tubular shape, through which the contents from the container pass, provided with an annular end surface around an opening formed at one end portion of the tubular part in an axial direction, the tubular part including a tubular member in which a functional resin layer is disposed as an intermediate layer; and
a resin layer covering an end surface of the one end portion of the tubular member, the resin layer covering at least the functional resin layer, and
the closing member includes an annular contact part coming into contact with the resin layer to close the opening positioned at the one end portion of the tubular part.

4. The discharge member with a closing member according to claim 3, wherein a surface of the resin layer is not inclined with respect to the end surface of the one end portion of the tubular member, the surface of the resin layer being contact with the annular contact part.

5. The discharge member with a closing member according to claim 3, wherein a surface of the resin layer is parallel with respect to the end surface of the one end portion of the tubular member, the surface of the resin layer being contact with the annular contact part.

6. The discharge member with a closing member according to claim 4, wherein a surface of the resin layer is parallel with respect to the end surface of the one end portion of the tubular member, the surface of the resin layer being contact with the annular contact part.

* * * * *